United States Patent [19]
Lee et al.

[11] Patent Number: 5,494,547
[45] Date of Patent: *Feb. 27, 1996

[54] FILM FOR PACKAGING HAVING OXYGEN BARRIER CHARACTERISTICS

[75] Inventors: Chi-Long Lee; Ming-Hsiung Yeh, both of Midland, Mich.

[73] Assignee: Dow Corning Corporation, Midland, Mich.

[*] Notice: The term ot this patent shall not extend beyond the expiration date of Pat. No. 5,370,937.

[21] Appl. No.: 201,294

[22] Filed: Feb. 24, 1994

Related U.S. Application Data

[63] Continuation-in-part of Ser. No. 62,378, May 14, 1993, Pat. No. 5,372,880, is a continuation of Ser. No. 124,120, Sep. 20, 1993, Pat. No. 5,370,937.

[51] Int. Cl.$^6$ ..................................................... B32B 31/00
[52] U.S. Cl. .................. 156/182; 156/272.6; 156/280; 156/310; 156/315; 156/324; 156/327; 427/508; 427/536; 426/127
[58] Field of Search ........................ 156/324, 272.6, 156/280, 327, 182, 310, 315; 427/508, 536; 426/127

[56] References Cited

FOREIGN PATENT DOCUMENTS 1384791  4/1972  European Pat. Off. .

*Primary Examiner*—Chester T. Barry
*Attorney, Agent, or Firm*—Richard I. Gearhart

[57] ABSTRACT

The present invention relates to the composition, preparation, and use of multi-layer composite films comprising a core layer of low gas permeable material, two intermediate layers sandwiching the core layer, and two outer layers sandwiching the two intermediate layers. The core layer provides the excellent oxygen barrier property, whereas the intermediate and outer layers protect the core layer so the oxygen permeability of the resulting multi-layer composite film becomes independent on relative humidity.

13 Claims, 1 Drawing Sheet

FILM FOR PACKAGING HAVING OXYGEN BARRIER CHARACTERISTICS

FIELD OF THE INVENTION

This invention relates to multi-layer composite films generally, and multi-layer composite films for applications requiring low oxygen permeability in particular. This application is a continuation-in-part of U.S. Ser. No. 08/062,378 filed May 14, 1993 entitled "Barrier Film for Packaging," now U.S. Pat. No. 5,372,880, and a divisional of application Ser. No. 08/124,120 filed on Sep. 20, 1993, now U.S. Pat. No. 5,370,937.

BACKGROUND OF THE INVENTION

Packages allowing significant penetration of oxygen or other gases are undesirable where gas transmission contributes to the decay of the packaged product. For example, the development of packages having low oxygen transmission rates, i.e. high oxygen barrier properties, has long been a desirable objective in the food packaging industry, because low gas permeability food packages increase the shelf life of the packaged food products. Packages having low oxygen transmission rates also have utility for packaging other oxygen sensitive materials, such as oxygen activated sealants. Longer shelf life of the product increases inventory efficiency for distributors, and reduces the likelihood that the consumer will accidently purchase a contaminated product. For a plastic film no be qualified for food packaging applications, therefore, the film has to have low oxygen permeability not only at flow relative humidity, but also at high relative humidity since the packed food may be stored in the high humidity environment. Unfortunately most of the commercially available plastic film cannot meet these two requirements simultaneously. For example, polyvinylalcohol has very low oxygen permeability at 0% relative humidity but high oxygen permeability when the relative humidity exceeds 70%. On the other hand, the oxygen permeability of polyolefins such as polyethylene and polypropylene are independent of relative humidity, but have oxygen permeability which is too high for food packaging applications. The ideal film will have both low oxygen permeability and will be insensitive to relative humidity. The present invention solves these problems by teaching a multi-layer composite, silicone treated plastic film which exhibits excellent low gas transmission characteristics both at 0% relative humidity and at 85% relative humidity. The resulting films are transparent, flexible and creasable, and will not crack when bent.

SUMMARY OF INVENTION

The present invention relates to the composition and preparation of multi-layer composite films comprising a core layer of very low gas transmission material, two intermediate layers sandwiching the core layer, and two outer layers sandwiching the two intermediate layers. The core layer provides the excellent gas barrier property, whereas the intermediate and outer layers protect the core layer so that the gas barrier characteristics of the resulting multi-layer composite film becomes insensitive to moisture.

U.S. Pat. Nos. 5,077,135 and 5,096,738 to Wyman disclose a method of imbuing polymer films with gas impermeable surface characteristics using a silane compound and cross-linking same, while providing physical adsorption adherence to the film and with sufficient coating to produce gas and related barrier characteristics. However, the present invention is distinguishable from the '135 and '738 patents because the present invention teaches a composition and method for use in composite films, rather than a single polymer film as disclosed in the '135 and '738 patents.

BRIEF DESCRIPTION OF THE DRAWINGS

A fuller understanding of the foregoing may be had by reference to the accompanying drawings, wherein.

DESCRIPTION OF THE PREFERRED EMBODIMENTS

Figure 1:
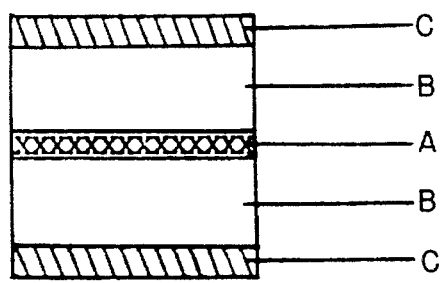
FIG. 1 is a cross-sectional view of the preferred embodiment of the invention showing the C/B/A/B/C configuration of the multi-layer film.

While the invention is susceptible of embodiment in many different forms there is shown in the drawings and will be described herein in detail, preferred and alternate embodiments of the invention. It should be understood, however, that the present disclosure is to be considered an exemplification of the principles of the invention and is not intended to limit the spirit and scope of the invention and/or claims of the embodiments illustrated.

In the following embodiments and examples of the invention, Layer A is a core layer containing a $O_2$ or $CO_2$ barrier material, such as polyvinylalcohol (PVOH), well known in the art to have low oxygen transmission characteristics. The core layer can be between about 2 microns and 25 microns thick and is preferably 7 microns thick.

In the following embodiments and examples of the invention, Layers B function as substrates and are either intermediate or outer layers depending on the configuration of the multi-layer film. Layers B are a protective plastic material whose $O_2$ and $CO_2$ permeability is independent of the relative humidity of the environment. The plastic material may, but need not be, a commercially available polyolefin, such as polyethylene, polypropylene, or polyethyleneterephthalate or a polyester, such as MYLAR available from DuPont, (Wilmington, Del.). Layers B may be any thickness, but will likely be at least 25 microns thick.

In the following embodiments and examples of the invention, Layers C are either outer or intermediate layers depending on the configuration of the multi-layer film. The Layers C contain a protective material which retains the excellent $O_2$ and $CO_2$ barrier properties at high relative humidity. Outer layers C are silicone resin derived from a silane solution of either (1), (2), or (3) where:

(1) is

(i.e., N-2-(vinylbenzylamino)-ethyl- 3-aminopropyltrimethoxysilane) or

(i.e., N-2-(vinylbenzylamino)-ethyl-3-aminopropyltrimethoxysilane•monohydrogen chloride) in a water/alcohol mixture, and R is an alkyl radical of from 1–4 carbon atoms inclusive;

(2) is a silane solution derived from the following reactants:
- (a) a silane having the general formula $R^1Si(OR)_3$, where $R^1$ is a methyl or phenyl group and where R is an alkyl radical of from 1 to 4 carbon atoms inclusive;
- (b) a solvent, such as an alcohol or ketone; and
- (c) a silane having the general formula $R^2Si(OR^3)_3$, where $R^3$ is an alkyl radical of from 1 to 4 carbon atoms inclusive, and $R^2$ is selected from the group consisting of:
  - (i) $R^4HN(CH_2)_a-$, where $R^4$ is a hydrogen atom or an alkyl radical of from 1 to 4 carbon atoms inclusive, and a is an integer between 3 and 8 inclusive; and
  - (ii) $H_2N(CH_2)_bNH(CH_2)_c-$, where b is an integer between 2 and 8 inclusive and c is an integer between 3 and 8 inclusive; and (3) is a silane solution derived from a mixture of the following reactants:
- (a) a silane having the formula:

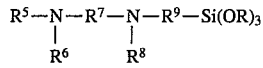

where:
R is a hydrocarbon radical having from one to four carbon atoms inclusive,
$R^5$, $R^6$, $R^8$ are selected from the group consisting of hydrogen, methyl or ethyl radicals, and at least one of $R^5$, $R^6$, $R^8$ is a hydrogen radical,
$R^7$ is a hydrocarbon radical having from two to four carbon atoms inclusive,
$R^9$ is a hydrocarbon radical having from three to six carbon atoms inclusive, (b) an acrylate selected from the group consisting of:

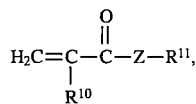

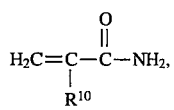

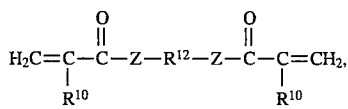

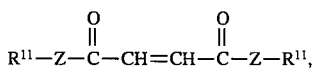

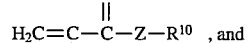

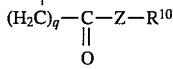

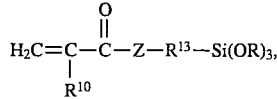

where:
R is as defined above,
$R^{10}$ is a hydrogen or methyl group,
$R^{11}$ is an alkyl or alkenyl group,
$R^{12}$ is an alkyl group, an alkenyl group, or a $-[(CH_2)_n-O]_x-(H_2C)_n$ group, where n is from 2 to 4, and x is from 1 to 6,
q is 1 or 0, and
Z is an oxygen, NH, NR, or $NR^{11}$, where R is a hydrocarbon radical having from one to four carbon atoms inclusive, and $R^{11}$ is an alkyl or alkenyl group; and (c) a solvent, such as methanol, ethanol, isopropanol or a mixture thereof;
and optionally,
(d) an additive selected from the group consisting of: $Si(OR)_4$ or a partial hydrolyzate thereof, or $R^{11}-Si(OR)_3$, where $R^{11}$ is an alkyl or alkenyl group, and R is a hydrocarbon radical having from one to four carbon atoms inclusive.

The silane solution (1) is coated on the substrate then dried to remove excess solvent, then cured to the substrate with a peroxide treatment or electron beam irradiation. The electron beam irradiation may take place at 4 megarads. Further explanation of the electron beam irradiation process for curing silane solution (1) is disclosed in U.S. Pat. Nos. 5,077,135 and 5,096,738 to Wyman. The silane solution (1) becomes a silicone resin on curing. The concentration of $CH_2=CHC_6H_4CH_2NHCH_2CH_2NHCH_2CH_2CH_2-Si(OR)_3$ or $HCl•CH_2=CHC_6H_4CH_2NHCH_2CH_2NHCH_2CH_2CH_2-Si(OR)_3$ in the methanol and water solution is in the range of 2% to 40%, where ratio of methanol to water in the methanol/water solution is between 6 to 1 and 100 to 1.

The concentration of solvent in silane solution (2) is in the range of 0 to 98% by weight where the ratio of $RSi(OR^1)_3$ to $R^2Si(OR^3)_3$ is between 10 and 0.1. Water may, but need not, be added to the silane solution (2). The silane solution (2) becomes a silicone resin on curing, either by drying or under heat in an oven. Layers C formed from silane solutions (1) or (2) may be between 0.5 microns and 5 microns thick and are preferably 2 microns thick.

Silane solution (3) is prepared by initially mixing the silane component (a) with the acrylate component (b) to form a silane mixture. The ratio of silane component (a) to acrylate component (b) in the same silane mixture can range from 1:0 to 1:1. The silane mixture may constitute up to 100 percent of the silane solution, but it is preferred that the silane mixture constitute 10 percent of the silane solution by weight.

To this silane mixture is added an appropriate amount of solvent, which may be methanol, ethanol, isopropanol or mixtures thereof. The amount of solvent added to the silane mixture can range from 1 percent to 99 percent of the total silane solution by weight, but is preferred to be about 80 percent by weight of the silane solution (3). After adding the solvent, water is added (up to 80 percent by weight of the silane solution (3), though 8 percent is preferred). Optionally, additive (d) may be added, which may comprise up to 50 percent by weight of the silane mixture. By partial hydrolyzate of $Si(OR)_4$ it is meant that portion of $Si(OR)_4$ which hydrolyizes in solution at room temperature. Once silane solution (3) is prepared, it is simply coated onto the layer B and air or oven dried, as more fully described herein.

The silane solution no. 3, when applied to a plastic substrate, has also been found to have excellent flavor/aroma barrier characteristics. The flavor/aroma barrier characteristics of silane solution no. 3 are more fully descibed in a pending U.S. patent application entitled "Silane Coated Flavor/Aroma Barrier Film", U.S. Pat. No. 5,434,007, the subject matter of which is incorporated herein by reference.

In the following embodiments and examples of the invention, the adhesive Layer D is preferably an acid or acid anhydride-modified polymers which can permanently bond the core layer A to the protective layers B or C. Typical adhesives are RA-1753, made by Monsanto Plastics & Resins (St. Louis, Mo.) and CXA-E162 produced by DuPont (Wilmington, Del.).

Referring specifically to the FIG. 1, a schematic cross-section of the preferred embodiment of the multi-layer composite film of the invention is shown. The film configuration can be generalized by the structure C/B/A/B/C. The preferred embodiment of the invention having a C/B/A/B/C composite configuration may be prepared by coating the first substrate on one side with a PVOH solution, then air drying at room temperature to form a B/A 2-layer film. The first substrate may be corona treated prior to coating. The corona treatment may, but need not, be done on a Model PS 10, manufactured by Corotec Corporation, Collinsville, Conn. The coated first substrate could also be oven dried.

A second substrate is laminated on top of the core layer/first substrate film with the core layer surface of the first substrate mating with the second substrate. The second substrate could also be corona treated prior to lamination.

Alternately, the second substrate could also be coated with a PVOH solution in the manner described for the first substrate prior to lamination to the first substrate. The first and second substrates are positioned so the PVOH layers of the first and second substrates face each other during lamination.

The lamination for either method could, but need not, be done by a Cord/Guard Model 6100 Laminator at 325 degrees F. The multi-layer film thus has a core layer (A) of oxygen barrier material such as PVOH, and two intermediate layers (B) of substrate.

The surface of the multi-layer B/A/B film is coated on both sides with a silane solution, which may be either silane solution (1), silane solution (2) or silane solution (3). The multi-layer B/A/B film could also be corona treated on both sides prior to coating with the silane solution. If the multi-layer B/A/B film is coated with silane solution (1), then silane solution (1) is cured to the substrate with a peroxide treatment or electron beam irradiation to form a silicone resin for outer layers (C). The cure process by peroxide treatment or electron beam irradiation is fully disclosed and described in U.S. Pat. Nos. 5,077,135 and 5,096,738 to Wyman.

If the multi-layer B/A/B film is coated with silane solution (2) or silane solution (3), then the particular silane solution is dried in air at room temperature to form a silicone resin resulting in outer layers (C). The silane solution (2) or silane solution (3) can also be oven dried to form the silicon resin.

The resulting C/B/A/B/C five-layer composite film thus has a core layer of PVOH (A), two intermediate layers of a substrate (B), and two outer layers of silicone resin (C).

Figure 2:
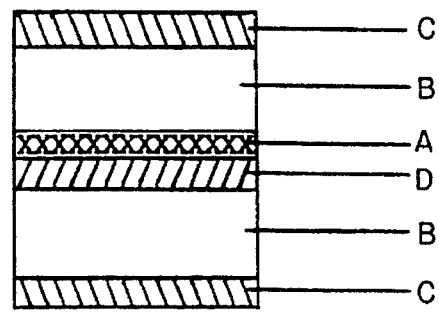
FIG. 2 is a cross-sectional view of the first alternate embodiment of the invention of FIG. 1 showing the C/B/A/D/B/C configuration of the multi-layer film.

FIG. 2 shows a first alternate embodiment of the invention, which includes adhesive layer D. The composite film configuration can be generalized by the structure C/B/A/D/B/C.

The first alternate embodiment of the invention may be prepared by coating a first substrate on one side with a PVOH solution and air drying at room temperature to give an A/B 2-layer film. The first substrate may also be corona treated prior coating with the PVOH solution. The coated first substrate could also be oven dried. A second substrate, with an adhesive on one side, is corona treated and laminated on top of the core layer/first substrate film with the core layer surface facing the adhesive. The lamination could, but need not, be done by a Cord/Guard Model 6100 Laminator at 325 degrees F. The multi-layer B/A/D/B film thus has a core layer (A) of oxygen barrier material such as PVOH, an adhesive layer (D), and two intermediate layers (B) of substrate. The surface of the multi-layer B/A/D/B film is then coated on both sides with a silane solution, which may be either silane solution (1), silane solution (2), or silane solution (3). The multi-layer B/A/D/B film could also be corona treated prior to coating with the silane solution.

If the multi-layer B/A/B film is coated with silane solution (1), then silane solution (1) is cured to the substrate with a peroxide treatment or electron beam irradiation. The cure process by peroxide treatment or electron beam irradiation is fully disclosed and described in U.S. Pat. Nos. 5,077,135 and 5,096,738 to Wyman. If the multi-layer B/A/D/B film is coated with silane solution (2) or siiane solution (3), then the particular silane solution is dried to form a silicone resin resulting in outer layers (C). Drying can take place in air at room temperature or in an even. The resulting C/B/A/D/B/C six-layer composite film thus has a core layer of PVOH (A), an adhesive layer (D), two intermediate layers of a substrate (B), and two outer layers of silicone resin (C).

Figure 3:
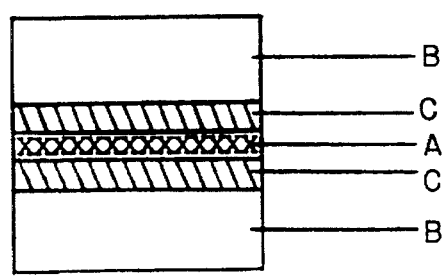
FIG. 3 is a cross-sectional view of the second alternate embodiment of the invention of FIG. 1 showing the B/C/A/C/B configuration of the multi-layer film.

FIG. 3 shows a second alternate embodiment of the invention. The composite film configuration can be generalized by the structure B/C/A/C/B. The second alternate embodiment can be prepared by coating first and second substrates (outer layers B) with a silane solution, which may be silane solution (1), silane solution (2) or silane solution (3). The first and second substrates could also be corona treated prior to coating with the silane solution.

If the substrates are coated with silane solution (1), then silane solution (1) is cured to the substrate with a peroxide treatment or electron beam irradiation to form a silicone resin for intermediate layers (C). The cure process by peroxide treatment or electron beam irradiation is fully disclosed and described in U.S. Pat. Nos. 5,077,135 and 5,096,738 to Wyman. If the substrates are coated with silane solution (2) or silane solution (3), then the particularly silane solution is allowed to cure to a silicone resin at room temperature to form intermediate layers (C). The film could have also been oven dried. This process results in two films having B/C configurations.

The first substrate is then coated on a second side with a solution of PVOH and air dried at room temperature. The first substrate could have been corona treated prior to coating with PVOH solution. The first substrate may have also been oven dried. The second substrate is then laminated to the first substrate, so the silicone resin side of the second substrate mates with the PVOH treated portion of the first substrate.

Alternately, the second substrate could also be coated with a PVOH solution over the silicon resin in a manner similar to the first substrate. The first and second substrates are positioned so the PVOH layers of the first and second substrates face each other during lamination.

The resulting multi-layer B/C/A/C/B composite film from either method consists of two outer layers of substrate (B), two intermediate layers of silicone resin (C), and a core layer of PVOH (A).

Figure 4:
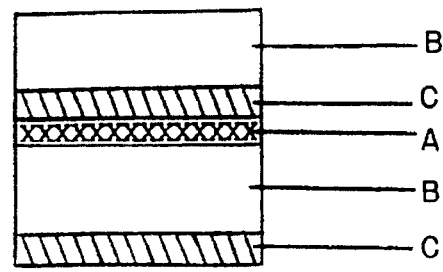
FIG. 4 is a cross-sectional view of the third alternate embodiment of the invention of FIG. 1 showing the B/C/A/B/C configuration of the multi-layer film.

FIG. 4 shows a third alternate embodiment of the invention. The composite film configuration can be generalized by the structure B/C/A/B/C. To prepare the third alternate embodiment, first and second substrates of at least 25 micron thickness each are coated on a first side with a silane solution, which may be silane solution (1), silane solution (2) or silane solution (3). The first and second substrates may be corona treated prior to coating with the silane solution.

If the substrates are coated with silane solution (1), then silane solution (1) is cured to the substrate with a peroxide treatment or electron beam irradiation to form a silicone resin. The cure process by peroxide treatment or electron beam irradiation is fully disclosed and described in U.S. Pat. Nos. 5,077,135 and 5,096,738 to Wyman. If the substrates are coated with silane solution (2) or silane solution (3), then the particular silane solution is allowed to cure to form a silicone resin at room temperature to give two B/C 2-layer films.

The first substrate is then coated on a second side with a PVOH solution of water or water/alcohol mixture, to give an A/B/C type film and air dried at room temperature. The second substrate is then coated on the silicone resin side with a PVOH solution of water or water/alcohol mixture, and air dried at room temperature to give a B/C/A 3-layer film. The first and second substrates may have also been corona treated prior to coating with the PVOH solution.

The first and second substrates are then laminated so that PVOH of the first substrate mate with the PVOH of the second substrate, forming a B/C/A/B/C type film having a substrate layer (layer B), a silicone resin layer (layer C), a PVOH core layer, another substrate layer (layer B), and a silicone resin layer (layer C).

EXAMPLES

The measurements of oxygen permeability for each of the composite films discussed in the following examples were made using pure oxygen on a MOCON OX-TRAN 100A tester according to the ASTM F1307-90 at 32.5° C. "Dry" readings were taken in an environment where the relative humidity was 0 percent and the "wet" readings were taken in an environment where the relative humidity was greater than 85 percent. Corona treatment of the substrates was done by passing the substrate under a Tesla Coil for approximately one-half second. All the films produced below are transparent, flexible and creasable, and will not crack when bent.

EXAMPLE I

To prepare a composite C/B/A/B/C type film, a first low density polyethylene (LDPE) substrate of 100 micron thickness was corona treated and coated on one side with a 10% PVOH solution of water/methanol mixture, where the ratio of water to methanol is 9:1 by weight. The first substrate was then air dried at room temperature. Coating thickness of the PVOH was estimated to be 7 microns. A second LDPE substrate, also of 100 micron thickness was corona treated and laminated on top of the PVOH/LDPE film with the PVOH surface facing the first substrate to give a LDPE/PVOH/LDPE 3-layer film. The lamination was conducted by a Cord/Guard Model 6100 Laminator at 325 degrees F. This B/A/B type three-layer film acted as a control and showed a dry oxygen transmission rate of 7.40 ml/m$^2$/day and a wet oxygen transmission rate of 28.00 ml/m$^2$/day.

A second B/A/B type three-layer film was prepared in the same manner as the B/A/B type three-layer control film described above. The surface of the second three-layer film was then corona treated on both sides and coated on both sides with each of the silane solutions described below. Cure of the coated silane solution took place in air at room temperature to form a silicone resin. The coating thickness of both silicone layers was estimated to be 2 microns. The resulting C/B/A/B/C type five-layer composite film thus had a core layer of PVOH, two intermediate layers of LDPE and two outer layers of silicone resin.

The first silane solution consisted of 25 grams HCl·CH$_2$=CHC$_6$H$_4$CH$_2$NHCH$_2$CH$_2$NHCH$_2$CH$_2$CH$_2$—Si(OMe)$_3$ solution (40% by weight in methanol), 75 grams methanol and 4 grams water, and was aged for 16 hours prior to coating. The excess solvent was removed by drying the treated film for 2 hours at 25° C. The cure of the silane solution took place by electron beam irradiation, which consisted of exposure of the film to 4 megarads of radiation. The resulting composite C/B/A/B/C five-layer film achieved excellent oxygen barrier characteristics, showing a dry oxygen transmission rate of 0.20 ml/m$^2$/day and a wet oxygen transmission rate of 0.20 ml/m$^2$/day.

The second silane solution consisted of 25 grams HCl·CH$_2$=CHC$_6$H$_4$CH$_2$NHCH$_2$CH$_2$NHCH$_2$CH$_2$CH$_2$—Si(OMe)$_3$ solution (40% by weight in methanol), 75 grams methanol and 4 grams water, and was aged for 16 hours prior to coating. The coated film was not subjected to electron beam irradiation after coating, but was allowed to cure in the air. The resulting composite C/B/A/B/C five-layer film still achieved excellent oxygen barrier characteristics, showing a dry oxygen transmission rate of 0.65 ml/m$^2$/day and a wet oxygen transmission rate of 2.9 ml/m$^2$/day although these values are slightly higher than the case where the film has two cured Layers C.

The third silane solution consisted of 5 grams methyltrimethoxysilane, 5 grams 3-amino-propyltriethoxy silane, 90 grams methylethyl ketone (MEK) and 4 grams water. The resulting composite C/B/A/B/C five-layer film achieved excellent oxygen barrier characteristics, showing a dry oxygen transmission rate of 0.40 ml/m$^2$/day and a wet oxygen transmission rate of 2.20 ml/m$^2$/day. Similar results were achieved even when this method was repeated and the thickness of the first LDPE substrate was reduced from 100 to 40 microns. The C/B/A/B/C five-layer composite film where the first LDPE substrate was 40 microns thick showed a dry oxygen transmission rate of 0.20 ml/m$^2$/day and a wet oxygen transmission rate of 2.70 ml/m$^2$/day. The five-layer composite film where the thickness of both substrates was 100 microns also exhibited good CO$_2$ barrier properties as well, with a CO$_2$ transmission rate of 10 ml/m$^2$/day at 23° C. and 0 percent relative humidity.

The fourth silane solution consisted of 5 grams methyltrimethoxysilane, 5 grams 3-amino-propyltriethoxy silane, 90 grams methylethyl ketone (MEK), but no water was added to the silane solution. The resulting composite C/B/A/B/C five-layer film achieved excellent oxygen barrier characteristics, showing a dry oxygen transmission rate of 0.2 ml/m$^2$/day and a wet oxygen transmission rate of 1.3 ml/m$^2$/day.

The fifth silane solution consisted of 5 grams methyltrimethoxysilane, 5 grams phenyltriethoxy silane, 90 grams methylethyl ketone (MEK) and 4 grams water. The resulting C/B/A/B/C type five-layer composite film achieved excellent oxygen barrier characteristics, showing a dry oxygen transmission rate of 0.50 ml/m$^2$/day and a wet transmission rate of 4.30 ml/m$^2$/day.

The sixth silane solution consisted of a mixture of 10 grams of H$_2$N—CH$_2$CH$_2$—NH—CH$_2$—CH$_2$—CH$_2$—Si(OCH$_3$)$_3$ plus 2 grams of methyl acrylate (H$_2$C=CH—(C=O)—O—CH$_3$). To 10 grams of the resulting mixture was added 90 grams of isopropyl alcohol and 8 grams of water. The resulting C/B/A/B/C type five-layer composite film achieved excellent oxygen barrier characteristics, showing a dry oxygen transmission rate of 0.20 ml/m$^2$/day and a wet transmission rate of 1.35 ml/m$^2$/day.

All of the five-layer composite silane treated films show significant decrease in oxygen permeability over the three-layer B/A/B control film, thus improving the oxygen barrier characteristics by an order of magnitude. This is attributed to the presence of silicone resin layer C, which protects the PVOH from water.

EXAMPLE II

Both sides of an LDPE substrate of 100 micron thickness were corona treated. The LDPE substrate was coated on both sides with a silane solution, consisting of 25 grams HCl·CH$_2$=CHC$_6$H$_4$CH$_2$NHCH$_2$CH$_2$NHCH$_2$CH$_2$CH$_2$—Si(OMe)$_3$ solution (40% by weight in methanol), 75 grams methanol and 4 grams water, and aged for 16 hours prior to coating. The cure of the silane solution took place by electron beam irradiation after coating and the removal of solvent. After coating the film formed a three-layer film having two outer layers of silicone resin, and a core layer of LDPE. Coating thickness of the silane layers were estimated to be between 1 and 2 microns each. The resulting three-layer composite film showed a dry oxygen transmission rate of 30 ml/m$^2$/day and a wet oxygen transmission rate of over 2000 ml/m$^2$/day. The difference between the 3-layer film described in this example and the 5-layer film described in Example I is the absence of PVOH core layer in the former film. The former film not only gives higher dry oxygen transmission rate (by two orders of magnitude) but also shows drastic dependence on relative humidity (by another two orders of magnitude.) The superior oxygen barrier characteristics and humidity independent of oxygen permeability exhibited by the 5-layer film described in Example I is attributed to the presence of both silicone resin layer and the PVOH core layer.

EXAMPLE III

To prepare a composite C/B/A/D/B/C type film, a first LDPE substrate was corona treated and coated on one side with a 10% PVOH solution in water/methanol mixture, where the ratio of water to alcohol was 9:1 by weight. The substrate was dried in the air at room temperature to give a B/A type film. Coating thickness of the PVOH layer was estimated to be 6 microns. A second LDPE substrate, with RA-1753 adhesive on one side, was laminated on top of the PVOH/LDPE film with the PVOH surface facing the adhesive. This B/A/D/B type four-layer film acted as a control and showed a dry oxygen transmission rate of 2.10 ml/m$^2$/day and a wet oxygen transmission rate of 62.00 ml/m$^2$/day.

A second B/A/D/B four-layer film was prepared in the same manner as the B/A/D/B four-layer control film described above. The surface of the four-layer film was corona treated on both sides, then coated on both sides with a silane solution, consisting of 5 grams methyltrimethoxysilane, 5 grams 3-amino-propyltriethoxysilane, 90 grams methylethyl ketone (MEK) and 4 grams water. Coating thickness of the silane was estimated at 2 microns. Cure of the coated silane in air resulted in a silicone resin. The resulting C/B/A/D/B/C six-layer composite film thus had a core layer of PVOH, a layer of adhesive, two intermediate layers of LDPE and two outer layers of silicone resin.

The resulting six-layer composite film achieved excellent barrier characteristics, showing a dry oxygen transmission rate of 0.25 ml/m$^2$/day and a wet oxygen transmission rate of 1.50 ml/m$^2$/day. Similar results were achieved even when the first and second LDPE substrates were replaced with 50 micron thickness polypropylene substrates. Where the polypropylene substrates were treated to form a C/B/A/D/B/C six-layer composite film, a dry oxygen transmission rate of 0.30 ml/m$^2$/day and a wet oxygen transmission rate of 1.70 ml/m$^2$/day were obtained. These results showed a significant decrease in oxygen permeability over the four-layer control film, thus improving the barrier characteristics by an order of magnitude.

EXAMPLE IV

To prepare a B/C/A/C/B type composite film, first and second LDPE substrates of 100 micron thickness each were corona treated. Each LDPE substrate was coated on a first side with a silane solution described below. Coating thickness of each silane layer was estimated to be between 1 and 2 microns. After coating each film was allowed to cure at room temperature to form a silicone resin. This process gave two B/C type two layer films.

The first LDPE substrate (B/C type two layer film) was then corona treated and coated on a first side over the silicone resin with a 10% PVOH solution in water/methanol mixture where the ratio of water to alcohol was 9:1 by weight. The LDPE substrate was then air dried at room temperature. Coating thickness of the PVOH was estimated to be 7 microns. The second LDPE substrate was then laminated to the first LDPE substrate, so the silane solution treated side of the second LDPE substrate mated with the PVOH treated portion of the first LDPE substrate. The resulting B/C/A/C/B type five-layer composite film consisted of two outer layers of LDPE, two intermediate layers of silicone resin derived from the silane solution, and a core layer of PVOH.

The first silane solution consisted of 5 grams methyltrimethoxysilane, 5 grams 3-amino-propyltriethoxy silane, 90 grams methylethyl ketone (MEK) and 4 grams water. The resulting B/C/A/C/B multi-layer film achieved excellent oxygen barrier characteristics, showing a dry oxygen transmission rate of 0.90 ml/m$^2$/day and a wet oxygen transmission rate of 5.10 ml/m$^2$/day.

The second silane solution consisted of a mixture of 10 grams of H$_2$N—CH$_2$CH$_2$—NH—CH$_2$—CH$_2$—CH$_2$—Si(OCH$_3$)$_3$ plus 2 grams of methyl acrylate (H$_2$C=CH—(C=O)—O—CH$_3$). To 10 grams of the resulting mixture was added 90 grams of isopropyl alcohol and 8 grams of water. The resulting B/C/A/C/B type five-layer composite film achieved excellent oxygen barrier characteristics, showing a dry oxygen transmission rate of 0.15 ml/m$^2$/day and a wet transmission rate of 1.15 ml/m$^2$/day.

The third silane solution consisted of a mixture of 10 grams of H$_2$N—CH$_2$CH$_2$—NH—CH$_2$—CH$_2$—CH$_2$—Si(OCH$_3$)$_3$ plus 2 grams of methyl acrylate (H$_2$C=CH—(C=O)—O—CH$_3$). To 10 grams of the resulting mixture was added 90 grams of isopropyl alcohol, 2 grams of the additive polydiethoxysiloxane and 8 grams of water. The resulting B/C/A/C/B type five-layer composite film achieved excellent oxygen barrier characteristics, showing a dry oxygen transmission rate of 0.25 ml/m²/day and a wet transmission rate of 1.9 ml/m²/day.

EXAMPLE V

To prepare a B/C/A/B/C type composite film, first and second LDPE substrates of 100 micron thickness each were corona treated. Each LDPE substrate was coated on a first side with one of the silane solutions described below. Coating thickness of each silane layer was estimated to be between 1 and 2 microns. After coating the film was allowed to cure at room temperature to form a silicone resin, resulting in a B/C type two layer film.

The first LDPE substrate was corona treated and coated on a second side with a 5% PVOH solution in water/methanol mixture where the ratio of water to alcohol was 9:1 by weight and air dried at room temperature. Coating thickness of the PVOH was estimated to be 3.5 microns. The second LDPE substrate was then coated on the silicone resin side with a 5% PVOH solution in water/methanol mixture where the ratio of water to alcohol was 9:1 by weight, and air dried at room temperature. Coating thickness of the PVOH was estimated to be 3.5 microns.

Thereafter, the first and second substrates were laminated so that PVOH of the first substrate mated with the PVOH of the second substrate, forming a B/C/A/B/C type five-layer film having an LDPE layer, a silicone resin layer, a PVOH core layer, an LDPE layer, and a silicone resin layer.

The first silane solution consisted of 5 grams methyltrimethoxysilane, 5 grams 3-amino-propyltriethoxy silane, 90 grams methylethyl ketone (MEK) and 4 grams water. The resulting B/C/A/B/C type multi-layer film achieved excellent oxygen barrier characteristics, showing a dry oxygen transmission rate of 0.40 ml/m²/day and a wet oxygen transmission rate of 1.20 ml/m²/day.

The second silane solution consisted of a mixture of 10 grams of $H_2N—CH_2CH_2—NH—CH_2—CH_2—CH_2—Si(OCH_3)_3$ plus 2 grams of methyl acrylate ($H_2C=CH—(C=O)—O—CH_3$). To 10 grams of the resulting mixture was added 90 grams of isopropyl alcohol and 8 grams of water. The resulting B/C/A/B/C type five-layer composite film achieved excellent oxygen barrier characteristics, showing a dry oxygen transmission rate of 0.25 ml/m²/day and a wet transmission rate of 1.55 ml/m²/day.

EXAMPLE VI

Both sides of an LDPE substrate of 100 micron thickness were corona treated. The LDPE substrate was coated on both sides with a silane solution, consisting of 5 grams methyltrimethoxysilane, 5 grams 3-amino-propyltriethoxy silane, and 90 grams methylethyl ketone (MEK), and 4 grams water. After coating the film was allowed to cure at room temperature to form a three-layer film having two outer layers of silicone resin, and a core layer of LDPE. Coating thickness of the silane layers were estimated to be between 1 and 2 microns each. The resulting multi-layer composite film showed a dry oxygen transmission rate of 310 ml/m²/day and a wet oxygen transmission rate of 940 ml/m²/day. The high oxygen transmission can be attributed to the absence of PVOH core layer.

EXAMPLE VII

Both sides of an LDPE substrate of 100 micron thickness were corona treated. The LDPE substrate was coated on both sides with a silane solution, consisting of 5 grams methyltrimethoxysilane, 5 grams 3-amino-propyltriethoxy silane, and 90 grams methylethyl ketone (MEK). No water was added to the mixture. After coating the film was allowed to cure at room temperature to form a three-layer film having two outer layers of silicone resin, and a core layer of LDPE. Coating thickness of the silane layers were estimated to be between 1 and 2 microns each. The silane bonded to and therefore "wetted" the surface of the LDPE substrate even though water was not added to the silane solution. The resulting multi-layer composite film showed a dry oxygen transmission rate of 600 ml/m²/day and a wet oxygen transmission rate of over 1040 ml/m²/day.

EXAMPLE VIII

Both sides of a MYLAR® substrate (a polyester film available from DuPont, Wilmington, Del.) of 75 micron thickness were corona treated. The MYLAR® substrate was coated on both sides with a silane solution, consisting of 5 grams methyltrimethoxysilane, 5 grams 3-amino-propyltriethoxy silane, and 90 grams methylethyl ketone (MEK), and water. After coating the film was allowed to cure at room temperature to form a C/B/C three-layer film having two outer layers of silicone resin, and a core layer of MYLAR®. Coating thickness of the silane layers were estimated to be between 1 and 2 microns each.

The silane bonded no and therefore "wetted" the surface of the MYLAR® substrate. Moreover, the resulting multi-layer film achieved reasonably good oxygen barrier characteristics considering no PVOH was present in the film. Observed was a dry oxygen transmission rate of 12 ml/m²/day which was about half uncoated MYLAR® which has a dry oxygen transmission rate of 26 ml/m²/day.

The foregoing specification describes only the preferred embodiment and the alternate embodiments of the invention. Other embodiments may be articulated as well. It is expected that others will perceive differences which while differing from the foregoing, do not depart from the spirit and scope of the invention herein described and claimed.

What is claimed:

1. A method of producing a multi-layer composite film having a core layer of polyvinyl alcohol;

an intermediate layer of a plastic substrate disposed on each side of said core layer; and an outer layer of a silicone resin disposed on each respective intermediate layer, wherein said silicone resin is derived from a silane solution having the following reactants:

(a) a silane having the formula:

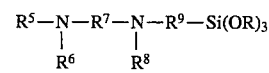

where:
   R is a hydrocarbon radical having from one to four carbon atoms inclusive,
   $R^5$, $R^6$, $R^8$ are selected from the group consisting of hydrogen, methyl and ethyl radicals, and at least one of $R^5$, $R^6$, or $R^8$ is a hydrogen radical,
   $R^7$ is a hydrocarbon radical having from two to four carbon atoms inclusive, R⁹ is a hydrocarbon radical having from three to six carbon atoms inclusive, (b) an acrylate selected from the group consisting of:

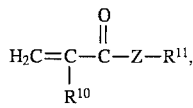

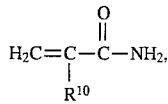

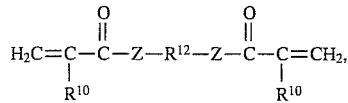

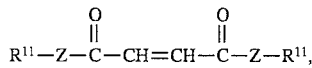

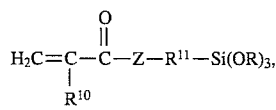

where:
R is as defined above,
R¹⁰ is a hydrogen or methyl group,
R¹¹ is an alkyl or alkenyl group,
R¹² is an alkyl group, an alkenyl group, or a —[(CH₂)ₙ—O]ₓ—(H₂C)ₙ group,
where each n is independently from 2 to 4, and x is from 1 to 6,
q is 1 or 0, and
Z is oxygen, NH, NR, or NR¹, where R is a hydrocarbon radical having from one to four carbon atoms inclusive, and R¹¹ is an alkyl or alkenyl group; and (c) a solvent, comprising the steps of;

coating a first side of a first plastic substrate with a core layer of polyvinyl alcohol then drying same;

disposing a second plastic substrate on said core layer on the coated side of said first plastic substrate to form a three-layer film having first and second sides;

coating said first and second sides of said three-layer film with a silane solution in the presence of water; and curing the silane solution to form a silicone resin coated multi-layer composite film.

2. The method of claim 1, comprising the additional step of exposing said first and second sides of said three-layer film to corona treatment prior to coating with said silane solution.

3. The method of claim 1, comprising the additional step of exposing said first side of said first plastic substrate to corona treatment prior to coating said first plastic substrate with polyvinyl alcohol.

4. The method of claim 1, wherein said second substrate is coated on a first side with a core layer of polyvinyl alcohol, and said polyvinyl alcohol is dried and said coating occurs prior to disposing said second substrate on said core layer of said first substrate.

5. The method of claim 1 comprising the additional step of drying said multi-layer composite film.

6. A method of producing a multi-layer composite film having a core layer of polyvinyl alcohol;

an intermediate layer of a silicone resin disposed each side of said core layer; and an outer layer of plastic substrate disposed on each respective intermediate layer, wherein said silicone resin is derived from a silane solution having the following reactants:

(a) a silane having the formula:

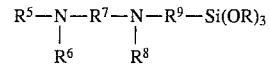

where:
R is a hydrocarbon radical having from one to four carbon atoms inclusive,
R⁵, R⁶, R⁸ are selected from the group consisting of hydrogen, methyl, and ethyl radicals, and at least one of R⁵ R⁶, or R⁸ is a hydrogen radical,
R⁷ is a hydrocarbon radical having from two to four carbon atoms inclusive,
R⁹ is a hydrocarbon radical having from three to six carbon atoms inclusive, (b) an acrylate selected from the group consisting of:

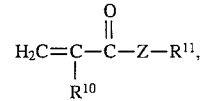

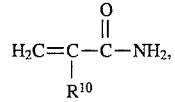

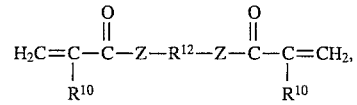

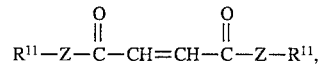

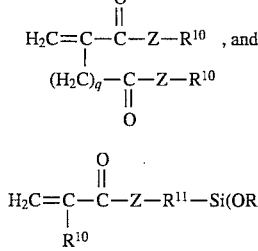

where:
R is as defined above,
R¹⁰ is a hydrogen or methyl group,
R¹¹ is an alkyl or alkenyl group,
R¹² is an alkyl group, an alkenyl group, or a —[(CH₂)ₙ—O]ₓ—(H₂C)ₙ group,
where each n is independently from 2 to 4, and x is from 1 to 6,
q is 1 or 0, and
Z is oxygen, NH, NR, or NR¹, where R is a hydrocarbon radical having from one to four carbon atoms inclusive, and $R^{11}$ is an alkyl or alkenyl group; and (c) a solvent, comprising the steps of:

coating a first side of a first plastic substrate with a layer of silane solution in the presence of water;

coating a first side of a second plastic substrate with a layer of silane solution in the presence of water;

drying said first and second plastic substrates to transform the silane solutions to a silicone resin;

coating said first side of said first plastic substrate with polyvinyl alcohol to form a core layer on said first plastic substrate;

drying said first plastic substrate; and bonding said first side of said second substrate to said core layer of said first substrate to form a multi-layer composite film.

7. The method of claim 6, comprising the additional steps of corona treating said first sides of said first and second substrates prior to coating with said silane solution.

8. The method of claim 6, comprising the additional step of exposing said first and second sides of said three-layer film to corona treatment prior to coating with said silane solution.

9. The method of claim 6, comprising the additional step of exposing said first side of said first plastic substrate to corona treatment prior to coating said first plastic substrate with polyvinyl alcohol.

10. The method of claim 6, wherein said second substrate is coated on a first side with a core layer of polyvinyl alcohol, and said polyvinyl alcohol is dried and said coating occurs prior to disposing said second substrate on said core layer of said first substrate.

11. The method of claim 6 comprising the additional step of drying said multi-layer composite film.

12. A method of producing a multi-layer composite film having a first outer layer of a plastic substrate, a first intermediate layer of a silicone resin disposed on said first outer layer, a core layer of polyvinyl alcohol disposed on said first intermediate layer, a second intermediate layer of a plastic substrate disposed on said core layer; and a second outer layer of a silicone resin disposed on said second intermediate layer, wherein said silicone resin is derived from a silane solution having the following reactants:

(a) a silane having the formula:

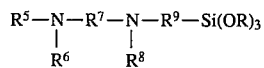

where:

R is a hydrocarbon radical having from one to four carbon atoms inclusive, $R^5$, $R^6$, $R^8$ are selected from the group consisting of hydrogen, methyl and ethyl radicals, and at least one of $R^5$, $R^6$, or $R^8$ is a hydrogen radical, $R^7$ is a hydrocarbon radical having from two to four carbon atoms inclusive, $R^9$ is a hydrocarbon radical having from three to six carbon atoms inclusive, (b) an acrylate selected from the group consisting of:

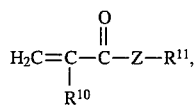

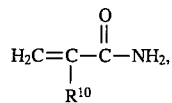

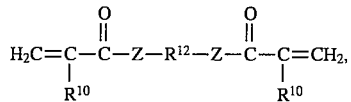

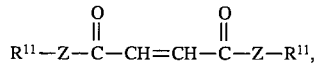

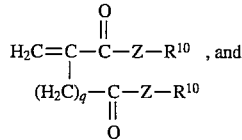

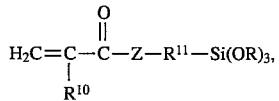

where:

R is as defined above, $R^{10}$ is a hydrogen or methyl group, $R^{11}$ is an alkyl or alkenyl group, $R^{12}$ is an alkyl group, an alkenyl group, or a $-[(CH_2)_n-O]_x-(H_2C)_n$ group, where each n is independently from 2 to 4, and x is from 1 to 6, q is 1 or 0, and Z is oxygen NH, NR or $NR^1$, where R is hydrocarbon radical having from one to four carbon atoms inclusive, and $R^{11}$ is an alkyl or alkenyl group; and (c) a solvent, comprising the steps of:

coating a first side of a first plastic substrate with a layer of silane solution in the presence of water;

coating a first side of a second plastic substrate with a layer of silane solution in the presence of water;

drying said first and second plastic substrates to transform the silane solution to a silicone resin;

coating a second side of said first substrate with polyvinyl alcohol;

coating said first side of said second substrate with polyvinyl alcohol;

drying said first and second substrates; and laminating said first side of said second substrate to said second side of said first substrate to form a multi-layer composite film.

13. The method of claim 12, comprising the additional steps of corona treating said first sides of said first and second substrates prior to coating with said silane solution.

* * * * *